United States Patent [19]

Welch

[11] Patent Number: 4,955,141
[45] Date of Patent: Sep. 11, 1990

[54] ADJUSTABLE PIVOT ANGLE SQUARE INVENTION

[76] Inventor: Richard E. Welch, 12 Centre Ave., Rockland, Mass. 02370

[21] Appl. No.: 246,988

[22] Filed: Sep. 20, 1988

[51] Int. Cl.$^5$ .............................. B43L 7/00; G01C 9/00
[52] U.S. Cl. ........................................ 33/418; 33/451; 33/458; 33/471
[58] Field of Search ................ 33/418, 423, 424, 426, 33/451, 453, 458, 465, 473, 498, 465, 496, 495, 471

[56] References Cited

U.S. PATENT DOCUMENTS

| | | | |
|---|---|---|---|
| 263,351 | 8/1882 | Phillips | 33/465 |
| 596,818 | 1/1898 | Moore | 33/465 X |
| 899,692 | 9/1908 | Clark | 33/471 |
| 1,210,370 | 12/1916 | Dvorak | 33/451 V |
| 1,630,773 | 5/1927 | Van Gale | 33/498 X |
| 1,916,638 | 7/1933 | Rizianu | 33/418 |
| 1,999,105 | 4/1935 | Milla | 33/453 |
| 3,345,750 | 10/1967 | Hill | 33/418 |
| 4,535,542 | 8/1985 | Liu et al. | 33/452 |

FOREIGN PATENT DOCUMENTS

2814712  3/1979  Fed. Rep. of Germany ........ 33/465

*Primary Examiner*—Daniel M. Yasich

[57] ABSTRACT

An reversible adjustable pivot angle square (10) comprising a a base blade (20) that contains a reversible level and plumb means (62) rotatably connected to a perpendicular travel blade (22) that contains a reversible level and plumb means (64) in an arrangement that forms an adjustable orthogonal position. The travel blade (22) design allows rotation to a 360 (three hundred and sixty) degree range. An angle blade (26) is angularly and rotatably connected to the base blade (20) at approximately mid center of the base blade (20) elongation. The base blade (20) design allows rotation to a 360 (three hundred and sixty) degree range. The travel blade (22) contains a through slot which runs substantially along the travel blade (22) elongation. The through slot serves as a travel blade slot (24) for the angle blade (26). Once the angle blade upper end (38) is slidably and adjustably connected to the travel blade slot (24), the adjustable pivot angle square (10) is completely pivotally and rotatably connected. This relationship allows complete angular positioning and movement the connecting of the angle blade to the travel blade by passing a travel slot pin mechanism (34) through the travel blade slot and threadedly couples to a travel lock bolt mechanism (60) by tightening or loosing the travel lock bolt mechanism (60) controls the movement and adjustment of the three blades.

5 Claims, 4 Drawing Sheets

ADJUSTABLE PIVOT ANGLE SQUARE INVENTION

BACKGROUND OF INVENTION

This invention relates to angle finding devices. Specifically to an adjustable pivot angle square. A disclosure document was sent to the Patent and Trademark office on Nov. 1, 1987. The specifics of this document are covered in an enclosed Disclosure Document Reference Letter.

In the construction and home improvement fields today, vast amounts of construction materials being used are large sheets or panels of (but not limited to) acrylic, poloycarbonates, glass, mirrors, sheetrock, plywood and sheetmetal. Modern builders, architects and designers are employing more and more geometric configurations of multiple sided angles in their designs.

This situation creates and causes many problems for the craftsman because of the difficulty in laying out, marking and proper scoring of the material for appropriate angular cuttings to be made employing existing prior art devices. Devices available today in the prior art are just not designed properly to achieve the desired results with complete accuracy and ease of operation. Large sheets require a device that can span the sheet completely across with no obstructions or impediments and have the design ability to rotate clockwise or counter clockwise through a full range of angles and positions quite freely and with complete accuracy.

It is also desired that the device be so designed that plumbness and levelness can be ascertained simultaneously or independently. Also that the degrees of unlevelness or out of plumbness can be discerned.

The device must be designed with completely unobstructed outside edges on the base member and the perpendicular member in any position in order that the device can actually sit on the base member and snug right up flush to the adjoining perpendicular or angled member when the devise is employed to discern and layout the angles of a recessed opening.

Additionally, the device must be capable of both right hand and left hand measurements and angles. It must also be designed for use by left handed and right handed craftsmen. The device, in order to butt flush to material that is being prepared for layout work, must have an inside shoulder on the base blade member of the device that can be used to establish a firm non-slipping position.

The device must be designed for easy transfer of an angle pattern to material that is to be marked, scored or cut. In addition the reverse face of the device must be designed perfectly flat and smooth and be devoid of obstructions or impediments that would impair the device from conforming perfectly flush to material being worked with. This is absolutely necessary to successfully complete a transfer with exact accuracy and dependability.

The device must be designed to provide a comfortable and non cumbersome position in order to avoid unnecessary movement or slippage by the craftsman and the material being worked with. Complete simplicity of design and ease of operation, coupled with the fact manufacturers will find manufacturing this device not only of great benefit to the industry but will constitute a very profitable benefit to themselves.

BACKGROUND

1. Description of Prior Art

Todays craftsmen are seeking a complete angle finding device which is simple in design, easily operated by one person and is capable of performing with professional accuracy through a full range of marking, layout, measuring and scoring difficult angles, triangles, trapezoids and other straight line configurations.

The device must be capable of pattern transfer to the material to be cut. The angle finding device must be designed specifically to accommodate the large sheet material used in todays construction, but not exclude the smaller construction members at the same time.

Heretofore, a wide variety of devices and instruments have been proposed and implemented for discerning angles and layout work. None of which has the design capacity that the adjustable pivot angle square provides. The following examples are given:

2. Prior Art Description

Pat. No. 4,729,173, Date of Patent Mar. 8, 1988, Wilson, Adjustable Carpenters Square.

The adjustable carpenters square by Wilson is incapable of precision marking or scoring of material without the danger of rocking or wobbling due to the uneven protrusions on the front face and reverse face.

Wilson shows knob protruding on the face side of head, protruding on the face side also is action bolt, protruding on the reverse face head nut with lock bolt also protruding on the reverse face.

The adjustable pivot angle square has been designed more carefully. All protrusions are on the front face of the device, thus creating a flat smooth reverse face which always lays flush to the surface to be worked on.

If the adjustable carpenters square were to be used on laying out or scoring of sheets of glass or mirrors it would be disastrous. Not only would the likelihood of skipping occur, but, slippage of the square would be present and a high risk of scratching the glass or mirror faces would exist.

The adjustable pivot angle square has been designed specifically with glass marking and scoring in mind.

Wilson's invention the adjustable carpenters square has so many appendixes that they prohibit the accurate discerning of lines of any two side angles at the same setting, especially within a recessed opening such as a store front etc. The adjustable pivot angle square has been designed to function fully and accurately in a recessed opening as well as in the open.

No matter how Wilson's adjustable carpenter square is turned, shifted or applied, due to its cumbersome design and many appendixes (such as the slide passing through the head creating obstructed edges, the knob protrudes beyond the plain of head, thus more obstructions, flat end protrusion coupled with knob protrusions) it is virtually impossible to plumb against anything with any degree of accuracy.

Wilson shows a rear view of the adjustable carpenters square in a 45 degree position. The head protrudes so much that it's obvious the device has not been designed for layout work on a flat cutting surface or table. The head protrudes so much that the operator of the device would have to be a contortionist to operate it with any degree of accuracy.

Overall, the invention is too cumbersome and designed with unnecessary joinary, such as the slide link to achieve its purpose in anything other than roof angles, rafters etc. Wilson shows and claims that a bubble end of head includes a vertically mounted plumb vial.

In order that the plumb vial function as required, the plumb vial would have to be mounted horizontally in a vertical member, not vertically as claimed.

The adjustable pivot angle square's vials are mounted as follows:

A level vial is mounted horizontally in base blade member. This level vial can be snapped out of its specially designed aperture and be reset to read oppositely if or as required.

Another vial is mounted horizontally in travel blade member, this level vial can also be snapped out of its specially designed aperture and reset to read oppositely if or as required.

The adjustable pivot angle square is designed to level and plumb together or separately, simultaneously or independently.

Wilson's adjustable carpenter square provides one edge of head and only one edge to be completely obstruction free for full width marking.

The adjustable pivot angle square has been designed so that the outside edges are always obstruction free, enabling the adjustable pivot angle square the ability to provide two obstruction free marking, scribing and scoring edges.

To copy an existing angle, the obstruction free straight edges of the adjustable pivot angle square allows the device to be placed flush against the edges of the angle to be transferred or discerned. As a result the adjustable pivot angle square base blade and travel blade are free to pivot to conform to the exact required angle adjustment of both lines simply and easily.

Wilson's adjustable carpenters square is just not designed to do this.

Pat. No. 622,569, Patented Apr. 14, 1899, J. A. Van Namee, Framing Square.

Van Namee's framing square is primarily designed as a framing square for roofs with a one to eighteen inch rise to the foot. This device was designed for roofs and as a result its functions are limited to situations and angles dealing with roof pitch, gable ends, rafters and associate members. The adjustable pivot angle square has been designed and engineered to allow for a one man operation in the layout and execution of difficult triangles, trapezoid, hexagons and other orthodox and unorthodox straight line configurations. The pivot angle square base and perpendicular blade rotate at the vertex point to ascertain any degree angle for marking, scribing or cutting.

The adjustable pivot angle squares ability to rotate clockwise and counter clockwise to a full range of angles and its ability to plumb and level simultaneously or independently combined with the many other outlined features make the adjustable pivot angle square a much more versatile and valuable tool.

Pat. No. 899,692, Patented Sept. 29, 1908, W. Clark, Anglefinder.

Clark's anglefinder is designed to register large acute angles from 20 degrees to 90 degrees with the left leg, while with the right leg indicates small angles that is less than 20 degrees.

The adjustable pivot angle square has been designed to discern virtually a full range of angles and geometric configurations.

The adjustable pivot angle square has also been designed not only to find and discern angles and straight line configurations, but to also layout, mark and score said angles.

Not only does the adjustable pivot angle square have unobstructed outside edges but its base member has an inside shoulder that allows the device to butt flush to material snugly. Thereby preventing unnecessary slippage while laying out and scoring such materials as (but not limited to) sheets of glass, mirrors, sheet rock and various flooring materials. Great benefits would be derived from the adjustable pivot angle square as it has been designed to function not only off of ladders and staging, but also in a flat horizontal position upon a work bench or cutting table.

Pat. No. 1,027,766, Patented May 18, 1912, D. Robertson & J. A. Atkinson, Roof Rafter Calculating Device.

This invention relates to devices for calculating the length of the rafters for the roofs of buildings. The device is awkward, cumbersome, too flexible and inadequately designed to perform the vast functions that the pivot angle square has been designed to do.

The roof rafter calculating device has numerous appendixes which would prohibit its use in a recessed opening as its design does not allow for its sitting on its base member flush to one end of the angle being discerned.

Furthermore, the roof rafter calculating device's lack of leveling and plumbing mechanisms limit the device severely in angle finding.

Users would desire the more compact and versatile adjustable pivot angle square.

Pat. No. 2,051,741, Patented August, 1936, G. H. Parker Jr., Drafting Instrument.

This instrument relates to drafting instruments and its primary objective is to provide a single instrument that will perform the functions required of separate instruments as employed by draftsman in the laying out of work. Parker's drafting instrument has not been designed to perform the vast array of functions that the adjustable pivot angle square can execute.

While the adjustable pivot angle square has been designed to perform many functions required of separate instruments used in laying out of work, it is also an angle finding device capable of plumbing and leveling both independently and simultaneously.

The adjustable pivot angle square does not need a separate T square as does Parker's instrument. The adjustable pivot angle square has been designed to pivot on its vertex pin, thus creating its own square, protractor and angle finding device that is capable of discerning more than one angle at the same setting.

An advantage of the adjustable pivot angle square is that it can be manufactured in a wide array of sizes for construction use, drafting use and even the educational field to teach geometry.

Pat. No. 866, Patented Apr. 29, 1808, Dearborn, Anglet.

This instrument is an angle finding device with restricted limitations as compared to the adjustable pivot angle square. As the anglet Letters Patent is hardly discernable, the figure drawing and what it illustrates is therefore the points and parts that will be examined.

The anglets horizontal base member does not contain a means of leveling at the base. The adjustable pivot angle square has been designed to achieve a true level position.

Anglets perpendicular operating member does not contain a means for plumbing. The adjustable pivot angle square has been designed with plumbing means and in fact is designed to level and plumb simultaneously or independently.

The anglets design prohibits the device from discerning angles in a recessed opening due to the appendixes at point B of the drawing. When the anglet is in a 90 degree position appendix B on bottom of perpendicular operating member creates a definite standoff at this point. This renders the anglet useless in a recessed opening as the anglet can not be set flush on the base member due to the protruding appendix. The same situation applies to the appendix at point B of the base horizontal member. This appendix prohibits the Anglets horizontal member from being rotated around to overcome this situation.

Although the rotation of the anglet counter clockwise allows the movable member to sit flush on the base of the opening, The anglets perpendicular members (appendix B) would then be in a horizontal position that would prohibit the anglets base (now in a vertical perpendicular position) from being set flush to a perpendicular member.

The adjustable pivot angle square has been designed specifically with recessed openings in mind. All outside edges of the adjustable pivot angle square are appendix free and absolutely obstruction free. Both left hand and right hand operation, regardless of the angle finding blade are obstruction free.

Users would find this a great advantage over Dearborn's anglet. For obvious reasons, as well as those previously stated, most users would find it desirable and advantageous to have such a superior tool as the adjustable pivot angle square.

OBJECTS AND ADVANTAGES

Accordingly, the inventor claims the following as objects and advantages of invention:

To provide a adjustable pivot angle square capable of performing layout work on large and small construction materials.

Another object of this invention is to provide a device for discerning a full range of angles.

Still another object of this invention is to provide a device that can discern angles in a recessed opening as readily as discerning open angles.

A further object of this invention is to provide a device that can discern more than one line of an angle simultaneously.

Yet another object of this invention is to provide a device with obstruction free outside edges thick enough in depth of thickness to serve as guides for marking, scoring or cutting to desired measurement.

A still further object of this invention is to provide a device with an inside base shoulder to butt flush against material to be worked on to insure against slippage.

A still further object of this invention is to provide a device that is easily reversible in order to mark and layout not only for left hand and right hand angle measurements, but also for use by left handed and right handed users.

Yet another object of this invention is to provide a device that requires only one operator regardless of size of material.

A still further object of my invention is to provide a device that can be used on materials laying flat on a horizontal work table or similar type of surface.

Yet another object of my invention is to provide a device that can be used while working in an upright position even off ladders or staging.

Still another object of this invention is to provide a device that levels and plumbs independently of each other or together.

A further object of this invention is to provide a device that provides a means of truing the device in an orthogonal position by means of a dual plumb and level system.

One more object of this invention is to allow for the acceptance of unbreakable level and plumb vials that readily snap in and snap out and can be turned to reverse level or plumb readings as required by position of invention.

Another object of this invention is to provide a device that rotates clockwise or counter clockwise from a horizontal base portion without impediment through a full range of angles.

Still another object of this invention is to provide a device that allows the horizontal base blade to rise or slope to conform to an existing angle measurement.

A further object of this invention is to provide a device that allows the perpendicular blade to pivot without impediment as desired clockwise or counter clockwise in order to discern angle measurements.

Continuing, another object of my invention is to provide a device that has a reverse side that is flat and completely devoid of obstructions.

Also an object of this invention is to provide a device with more than one unobstructed straight edge to serve as marking, scoring or scribing guides.

Yet another object of this invention is to provide a device that can be used in the process of cutting (but not excluding other materials) sheets of glass, mirrors and acrylics without danger of slippage through the use of slip proof tape strips on the travel blades reverse side.

Another object of this invention is to provide a device that can be stored and transported easily using a minimum of space.

Yet another object of this invention is to provide a device that can fit into conventional shipping containers to allow for easy and economical shipment, thus meeting UPS and Parcel Post limits and avoiding costly freight charges.

A still further object of this invention is to provide a device so simple in design, devoid of impediments and cumbersome configurations and unnecessary joinary, that a person having ordinary skill and common sense will fully understand the use and operation.

A final object of this invention is to provide a device which is not only simple to employ, accurate to precision and completely dependable but is also very practical and cost effective to manufacture.

DRAWING REFERENCE NUMERALS (10) Pivot Angle Square
(20) Base Blade
(22) Travel Blade
(24) Travel Slot
(26) Angle Blade
(28) Travel Blade Top End
(30) Travel Blade Lower End
(32) Angle Blade Lower End
(34) Travel Slot Pivot Pin Mechanism
(35) Angle Blade Pivot Pin Fastner
(36) Angle Blade Pivot Pin Aperture
(38) Angle Blade Upper End (40) Base Blade Angled End
(42) Base Blade Mounting Aperture
(44) Base Blade Straight End
(46) Base Vertex Pin Aperture
(48) Travel Blade Vertex Pin Aperture
(49) Base Blade Pivot Pin
(50) Base Level and Plumb Vial Aperture
(51) Base Blade Pivot Pin Fastner
(52) Pivot Angle Square Reverse Side
(54) Travel Blade Level and Plumb Vial Aperture
(56) Angle Blade Mounting Aperture
(58) Base Vertex Pin
(59) Base Vertex Pin Fastner
(60) Travel Blade Lock Bolt Mechanism
(62) Base Level Vial
(64) Travel Blade Plumb Vial
(66) Right Hand Inside Shoulder
(68) Left Hand Inside Shoulder
(70) First Right Hand Marking and Scoring Edge
(72) Second Right Hand Marking and Scoring Edge
(74) First Left Hand Marking and Scoring Edge
(76) Second Left Hand Marking and Scoring Edge
(78) Slip Proof Tape
(80) Base angle
(82) Angle Degree Markings
(84) Reverse Face Blade

BRIEF DESCRIPTION OF ADJUSTABLE PIVOT ANGLE SQUARE

As the figures are so interrelated, they are described as a group before going to the specific description of each drawing figure.

A adjustable pivot angle square consists of and is formed by having a base blade with a perpendicular travel blade secured to the extreme right edge of the base blade. The opposite end of the travel blade is movably connected to an angle blade which is movably connected to the base blade at a point midway on the center width of base blade and horizontally at a point approximately half the distance of the length of the base blade. The adjustable pivot angle square is generally made of aluminum. The travel blade, base blade and angle blade are connected in a manner that allows for rotation. The travel blade has a slot running vertically the length of travel blade. This travel slot allows the adjustable pivot angle square's base blade and travel blade to completely pivot and rotate as directed quickly, easily and smoothly.

DETAILED DESCRIPTION OF ADJUSTABLE PIVOT ANGLE SQUARE

Figures 1, 2:
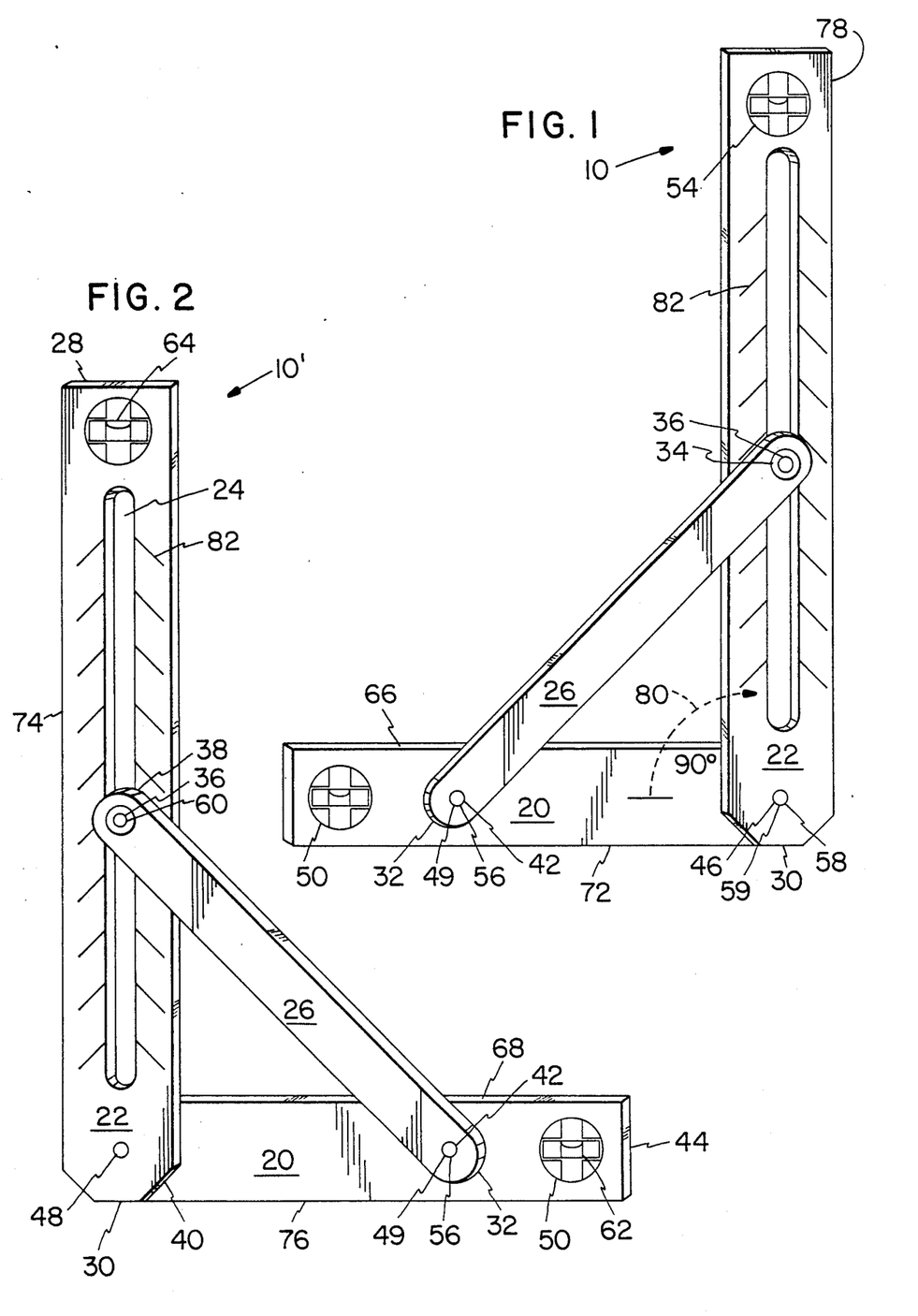
FIG. 1 is a front perspective view of the front of the adjustable pivot angle square 10 of this invention set at ninety (90) degrees in a right hand position.
FIG. 2 is a front perspective view of the front of the adjustable pivot angle square 10 of this invention set at ninety (90) degrees in a left hand position.
Figure 3:
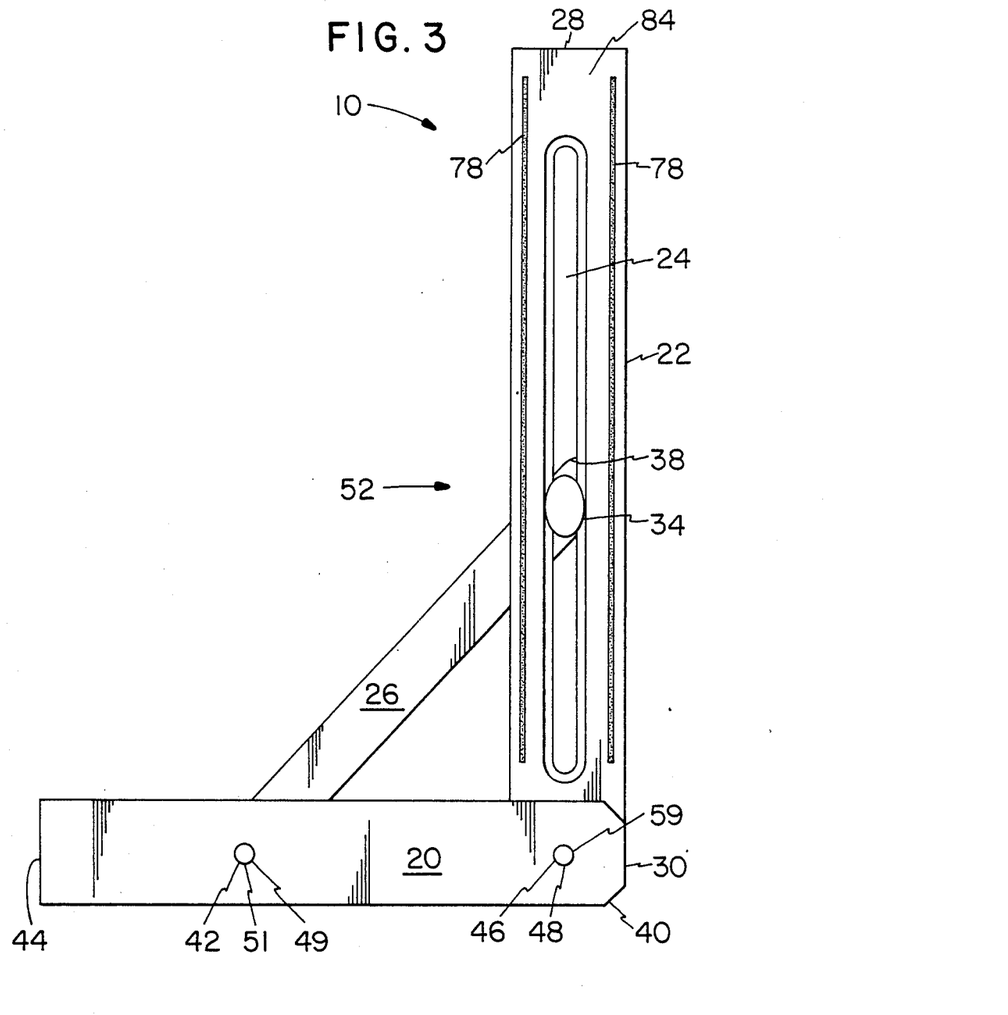
FIG. 3 is a plan rear view of the adjustable pivot angle square 10 of this invention showing reverse side of Pivot Angle Square 10 of this invention.

As illustrated in FIGS. 1, 2 and 3 of the drawings the adjustable pivot angle square 10 is formed by a base blade 20 which has a base blade straight end 44 and a base blade angled end 40 oppositely disposed from base blade straight end 44. The base blade 20 is connected to a travel blade 22 which has a travel blade top end 28 and a travel blade lower end 30 which is oppositely disposed from said travel blade top end 28. The base blade angled end 40 is overlapped by the travel blade lower end 30 and movably connected thereto by passing a base vertex pin 58 through a base vertex pin aperture 46 and a common axis travel blade vertex pin aperture 48 and securing with a base vertex pin fastener 59.

The base vertex pin 58 comprises a shoulder threaded slot head bolt appropriately sized and externally threaded to allow the base blade 20 and the travel blade 22 to rotate freely on axis of the shouldered section of the threaded bolt. The threaded part of shoulder threaded slot head bolt threads into the base vertex pin fastener 59 which comprises a counter sunk internally threaded sleeve. This connection is adjustable and rotatable.

Figures 4, 5:
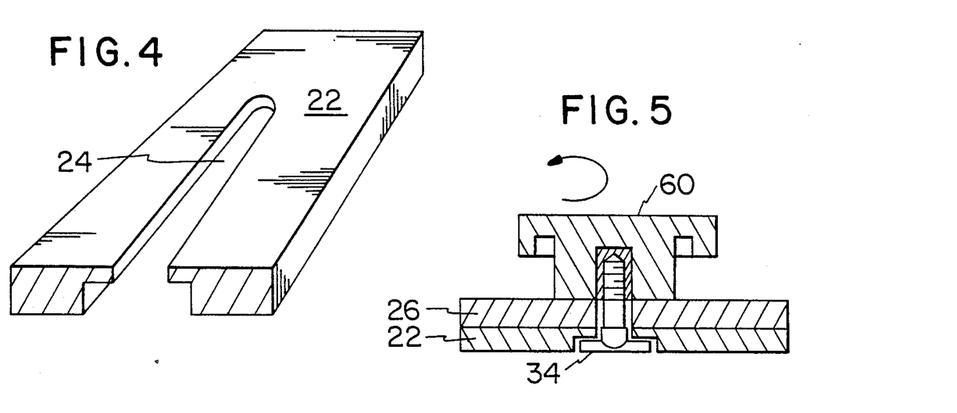
FIG. 4 is a partial, plan view illustrating the travel blades travel slot by showing a cutaway section view.
FIG. 5 is a partial side elevation view in section of the adjustable pivot angle square 10 travel blade and angle blade connected and locked by travel blade lock and bolt mechanism and travel slot pin mechanism.

Referring to FIGS. 1, 2, and 5 an angle blade 26 which has an angle blade upper end 38 and a angle blade lower end 32 oppositely disposed from said angle blade upper end 38 and is movably attached to a travel slot 24 which runs substantially the length of the travel blade 22 elongation.

The angle blade upper end 38 is connected by passing through a angle blade pivot pin aperture 36 at the angle blade upper end 38 and the travel slot 24 and angularly securing together by means of a travel blade lock bolt mechanism 60 and a travel slot pivot pin mechanism 34.

As shown in FIG. 5 the angle blade upper end 38 and the travel blade 22 are movably connected by passing the travel blade lock bolt mechanism 60 through the angle blade pivot pin aperture 36 at the angle blade upper end 38 and through the travel slot 24 and threadedly attaching to the travel slot pivot pin mechanism 34 which is threaded internally to receive the travel blade lock bolt mechanism 60.

The travel blade lock bolt mechanism 60 is a knob with a shouldered and externally threaded rod with the appropriate size and length of shoulder section to allow the angle blade 26 and the travel blade 22 to rotate on the shoulder section of the rod and the threaded section to threadedly connect to a threaded aperture in the center of the travel slot pin mechanism 34.

Referring to FIGS. 1, 2 and 3, the opposite end of the angle blade 26, the angle blade lower end 32 is angularly and movably attached to the base blade 20 through a angle blade mounting aperture 56 and a common axis base blade mounting aperture 42 with a base blade pivot pin 49 secured by a base blade pivot pin fastener 51.

The base blade pivot pin 49 comprises a shoulder and threaded slot head bolt appropriately sized and threaded to allow the base blade 20 and the angle blade 26 to rotate freely on axis of the shouldered section of threaded bolt. The external threaded end of shouldered bolt threaded connects to a base blade pivot pin fastener 51 which comprises a counter sunk internally threaded sleeve. This connection is rotatably adjustable.

The travel blade 22 pivots on the base vertex pin 58 while the angle blade 26 controls the amount of rotation clockwise or counter clockwise of the travel blade 22.

As illustrated in FIG. 4 the travel slot 24 runs vertically through the center of the face of the travel blade 22 elongation less approximately six inches on either end.

FIG. 3 shows the travel slot pivot pin mechanism 34 slidably engaged in the travel slot 24 and is movably connected to the travel blade lock bolt mechanism 60 which controls the travel slot pivot pin mechanism 34 movement.

As shown in FIG. 5, the travel blade lock bolt mechanism 60 pressure locks the travel slot pivot pin mechanism 34 by turning clockwise or counter clockwise as required to allow the travel blade 22 to rotate clockwise or counter clockwise as directed.

To lock or unlock the travel blade 22 the operator simply turns the travel blade lock bolt mechanism 60 counter clockwise to lock and clockwise to release or unlock.

As shown in FIGS. 1 and 2, the base blade 20 contains a base level and plumb level vial aperture 50 which receives a base level vial 62 to indicate whether the base blade 20 is level or not level. The travel blade 22 contains a travel blade level and plumb vial aperture 54 which receives a travel blade plumb vial 64 to indicate if the travel blade 22 is perfectly vertical and perfectly plumb or unplumb. FIG. 3 shows that the travel blade level and plumb vial aperture 54 and base level and plumb vial aperture 50 are not through apertures. As illustrated in FIGS. 1 and 2, the base blade 20 is provided with a right hand inside shoulder 66. The base blade 20 is also provided with a left hand inside shoulder 68. The travel blade 22 is provided with a first right hand marking and scoring edge 70 and also a second right hand marking and scoring edge 72 at the base blade 20.

FIGS. 1 and 2 also show angle degree markings 82 and a base angle 80. As illustrated in FIG. 2, when the Pivot Angle Square 10 is set in a left hand position, the travel blade is provided with a first left hand marking and scoring edge 74. The base blade is also provided with a second marking and scoring edge 76.

FIG. 3 illustrates that the adjustable pivot angle square reverse side 52.

FIG. 3 also illustrates that the travel blade 22 has a reverse face blade 84 that has a specially formulated slip proof tape 78 affixed to the reverse face blade 84 and running the vertical length of the reverse face blade 84.

FIG. 3 also illustrates the slip proof tape 78, the slip proof tape eliminates any slippage or marring of the work surface material while marking or scoring.

FIGS. 6, 7, 8, 9, 10, 11, 12, 13 and 14 illustrate various positions that the adjustable pivot angle square is capable of.

As used in this application, the terms "top", "bottom", "perpendicular", "base", and "side" are intended to facilitate the description of the adjustable pivot angle square. Thus such terms are merely illustrative of the adjustable pivot angle square and are not intended to limit the adjustable pivot angle square to any specific manner of orientation.

OPERATION OF INVENTION

The adjustable pivot angle square 10 is designed to perform a wide variety of mechanical functions including locating and identifying angles and providing a template by which to mark, score or scribe. The adjustable pivot angle square will not only discern angles on materials such as (but not limited to) glass, mirrors, acrylic, wall board, floor coverings and sheet rock, but will also enable the operator to mark and score the material using the one tool.

This is possible since the travel blade 22 and the base blade 20 have been designed to be completely free from obstructions thereby providing a smooth guide for scribing and marking along the first right hand marking and scoring edge 70, second right hand marking and scoring edge 72, first left hand marking and scoring edge 74 and second left hand marking and scoring edge 76.

The adjustable pivot angle square 10 is fully adjustable. By simply turning the travel blade lock bolt mechanism 60 clockwise the travel blade 22 is released and free to pivot on the base vertex pin 58. This now allows the travel blade 22 to rotate easily by hand either clockwise or counter clockwise to the desired measurements or angle.

Once the desired position is achieved the travel blade lock bolt mechanism 60 is then turned counter clockwise locking the travel blade 22 in said position.

As shown in FIGS. 11, 12, 13 and 14 the base blade 20 is able to pivot anytime that the travel slot mechanism 34 is unlocked, thus allowing the base blade 20 to rise or slope as required. Once the desired position is achieved, the operator simply turns the travel blade lock bolt mechanism 60 counter clockwise to lock the adjustable pivot angle square 10 in set position.

As FIGS. 6, 7, 8, 9, 11, 12, 13 and 14 illustrate the adjustable pivot angle square 10, the travel blade 22 and the base blade 20 can be rotated together or independently of each other. This is what provides the ability to establish a template regardless of whether a level or plumb position exists. Being plumb or level is not a prime factor the main concern is being able to conform to the angle desired and transferring secured angle measurements to material as required.

To reverse the adjustable pivot angle square 10 rotate from a 90 degree right hand position to a left hand position by turning the travel blade lock bolt mechanism 60 clockwise to release the pressure lock on travel blade 22 and proceed to rotate the travel blade 22 on its base vertex pin 58 clockwise a full 180 degrees.

Tighten the travel blade lock bolt mechanism 60 and the adjustable pivot angle square 10 has been reversed from right hand operation to left hand operation simply and easily without need of turning the adjustable pivot angle square 10 over to its reverse side 52.

The adjustable pivot angle square 10 has been designed specifically in this manner in order that the reverse side 52 maintains an obstruction and impediment free surface. This allows the adjustable pivot angle square 10 the ability to be placed absolutely flush to the material being worked on without any chance of marring or scratching the materials surface.

The right hand inside shoulder 66 permits the base blade 20 to butt up flush and conform to the material being worked on, thereby eliminating the danger of slippage while being used in a right hand position.

The left hand inside shoulder 68 permits the base blade 20 to butt flush and snug to material being worked on, thus insuring against slippage or marring of material while being employed in a left hand position.

Whether being used in a left hand position or a right hand position and regardless of the position the travel blade 22 and the base blade 20 are rotated to, the user is assured of clean uninterrupted marking edges because of the adjustable pivot angle squares 10 unique design.

Figure 6:
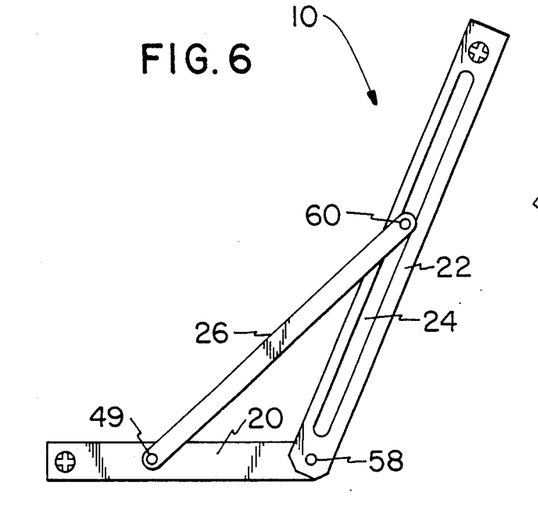
FIG. 6 is a plan, front view of the adjustable pivot angle square 10 of this invention rotated clockwise from a right hand position.
Figure 7:
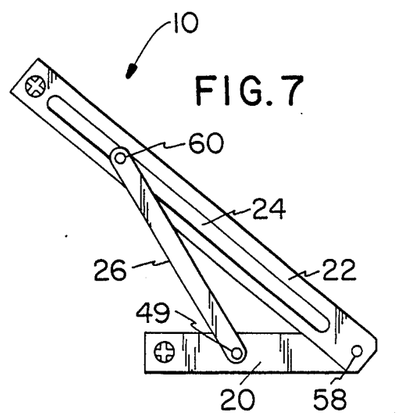
FIG. 7 is a plan, front view of the adjustable pivot angle square 10 of this invention rotated counter clockwise from a right hand position.

FIGS. 6 and 7 illustrate that when the travel blade 22 and the base blade 20 are in a right hand position, the first right hand marking and scoring edge 70 and the second right hand marking and scoring edge 72 are in the proper position to execute layout work while fully assured of clean, uninterrupted marking edges.

Figure 8:
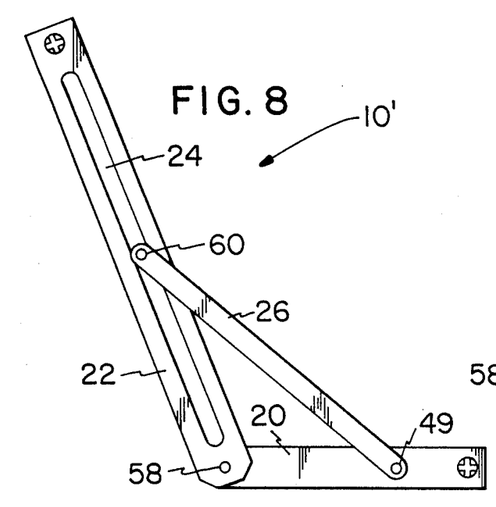
FIG. 8 is a plan, front view of the adjustable pivot angle square 10 of this invention rotated counter clockwise from a left hand position.
Figure 9:
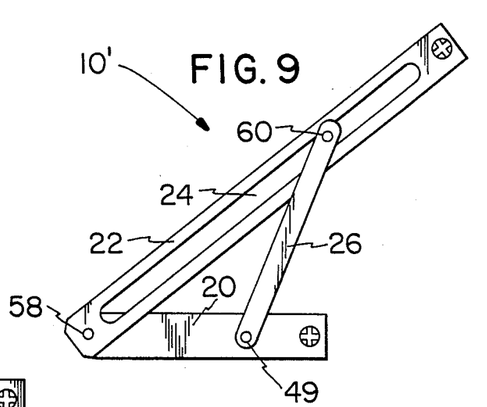
FIG. 9 is a plan, front view of the adjustable pivot angle square 10 of this invention rotated clockwise from a left hand position.
Figure 10:
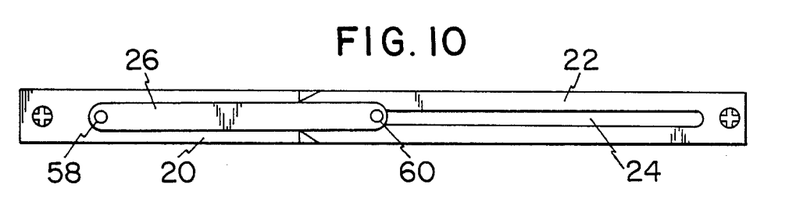
FIG. 10 is a plan, front view of the adjustable pivot angle square 10 of this invention rotated clockwise from a right hand position to a one hundred and eighty (180) degree position.
Figures 11, 12, 13, 14:
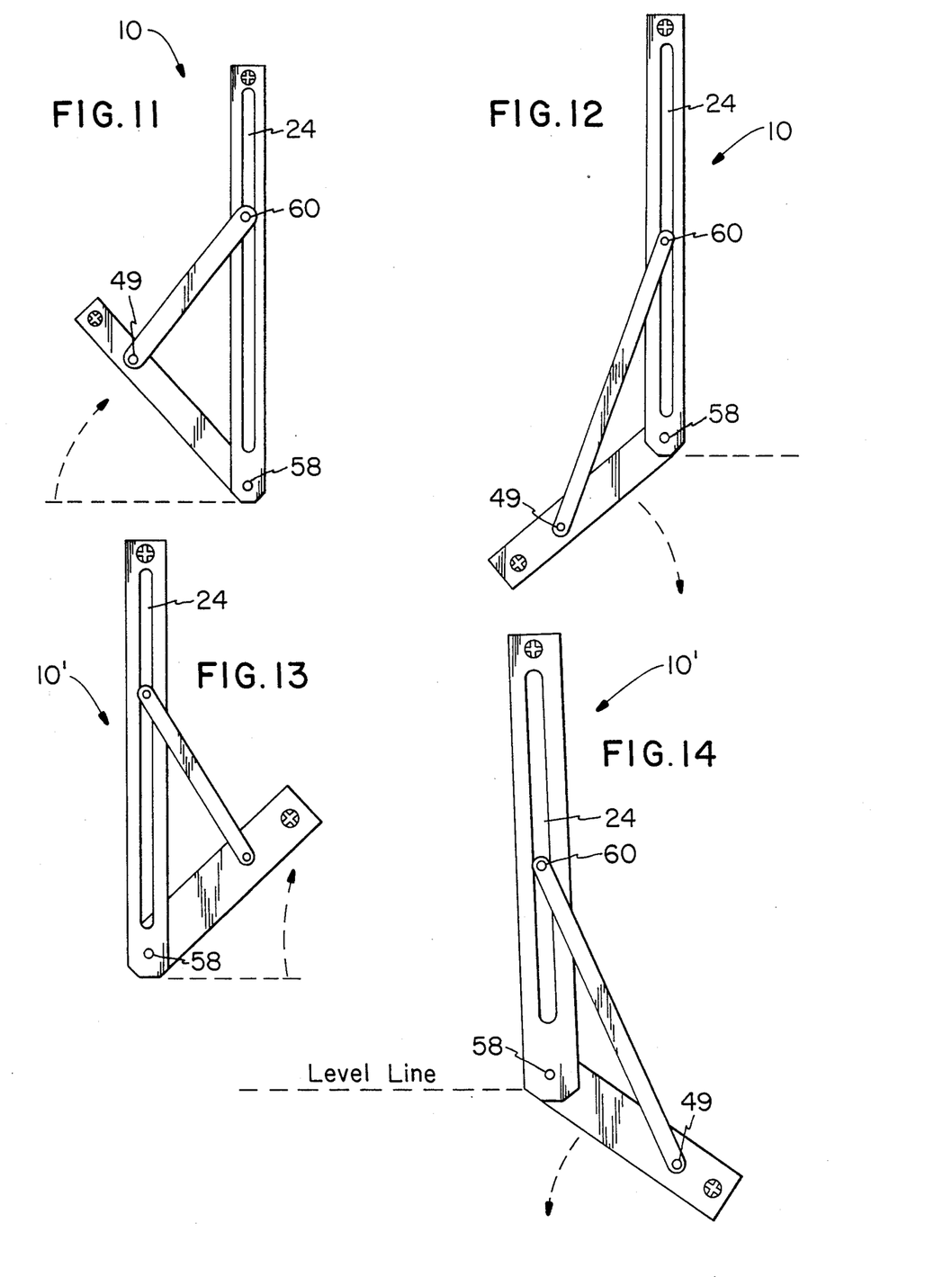
FIG. 11 is a plan, front view of the adjustable pivot angle square 10 of this invention with base blade pivoted up to a out of level position from a right hand position.
FIG. 12 is a plan, front view of the adjustable pivot angle square 10 of this invention with base blade sloping down to a out of level position from a right hand position.
FIG. 13 is a plan, front view of the adjustable pivot angle square 10 of this invention with base blade elevated up to a out of level position from a left hand position
FIG. 14 is a plan, front view of the adjustable pivot angle square 10 of this invention with base blade sloped downwards to a out of level position from a left hand position

FIGS. 8 and 9 illustrate that when the travel blade 22 and the base blade 20 are in a left hand position, the first left hand marking and scoring edge 74 and the second left hand marking and scoring edge 76 are automatically in the proper position to provide clean uninterrupted marking and scoring edges.

The adjustable pivot angle square 10 design, in which it is not necessary to turn the adjustable pivot angle square 10 over to its reverse side 52, allows this feature with no problems.

To discern an angle within a recessed opening such as a store front, the user simply sets the adjustable pivot angle square 10 into the existing opening on its base blade 20 and positions the travel blade 22 flush up against the openings perpendicular side.

As shown in FIGS. 11, 12, 13 and 14, if the openings sill or base is level, the base level vial 62 will prove it. With the travel blade 22 against the perpendicular surface the travel blade plumb vial 64 will ascertain whether the openings perpendicular surface is plumb.

If adjustments are necessary, the travel blade 22 and or the base blade 20 can be adjusted by loosing the travel blade lock bolt mechanism 60 to allow the necessary movement of the base blade 20 and or the travel blade 22.

Once the exact template is secured, the operator simply tightens the travel blade lock bolt mechanism 60 and transfers the adjustable pivot angle square 10 to the material to be marked or scored.

FIG. 3 illustrates that as the adjustable pivot angle square 10 has a reverse side 52 that is completely flat and devoid of impediments, it is a very suitable tool for marking and scoring of materials while laying on a flat surface since it will not rock or wobble while being used. The slip proof tape 78 applied to the travel blades reverse face blade 84 further insures this by preventing unwanted movement while providing a scratch and mar proof surface that will be in contact with the material being worked on.

This is especially important when working on materials with finished surfaces such as glass, mirrors and acrylics. The adjustable pivot angle square 10 can easily discern gable ends and other roof configurations quite simply by placing the travel blade 22 up against the rake board or roofs edge. Then while holding the adjustable pivot angle square 10 tight and flush to the surface, the base level vial 62 is used to establish a level base blade 20. The adjustable pivot angle square 10 is now ready to transfer the angle pattern to the material that is being worked on.

As the adjustable pivot angle square 10 is designed with unimpeded outside scoring edges and is equipped with dual level and plumb mechanisms, it can be employed to find angles not only by starting at the base, but can also be applied from the top.

This is done by setting the base blade 20 flush against the top header member and setting the travel blade 22 flush against the side perpendicular member or by setting the travel blade 22 flush to the header the base blade 20 against the perpendicular member and reverse set plumb and level vials to read accordingly.

Used in this manner, not only is the angle discerned but the levelness and plumbness is also discerned since both the level vial and plumb vial function in these positions. At any vertex pont of an angle, the adjustable pivot angle square 10 can discern the degree of levelness or unlevelness by use of the travel blade plumb vial 64 and base level vial 62.

FIGS. 6, 7, 8, 9, 11, 12, 13 and 14 illustrate that whether the angle to be discerned is right hand or left hand, acute or obtruse, in a recessed opening or an open angle, the adjustable pivot angle square 10 can discern the angle and layout the angle for transfer to the material that is to be cut.

The adjustable pivot angle square 10 provides marking and scoring edges 70, 72, 74 and 76 for whatever angle is required regardless of degree of angle.

The adjustable pivot angle square 10 can determine the line of an angle at any junction point of any straight line configuration.

While the preceding description contains many specificities, the reader should not construe these as limitations on the scope of the invention, but merely as exemplifications of preferred embodiments thereof.

Those skilled in the art will envision many other possible variations that are within its scope. For example, skilled artisans and craftsman will readily be able to change the dimensions and shapes of the various embodiments. They will be able to change the inventions material to alternate materials such as wood, plastic, steel or combinations thereof.

They can make variations of the adjustment mechanisms by using different screws, set screws or knobs. The base blade pivot pin and angle blade pivot pin fastener could be replaced by a rivet or other such device. Also the base blade vertex pin and base blade pivot pin fastener could could be changed in the same manner. An internally threaded knob or similar device could be used in place of the travel blade lock bolt mechanism and a externally threaded T bolt could be substituted for the travel slot pivot pin mechanism. The inventions travel slot can be eliminated by substituting a slotted or grooved metal runner surface mounted on the travel blades face, or by substituting a groove in place of the slot. The inventions calibrations and angle degree markings can be changed, altered or eliminated.

Two level vials could be inserted in the base blade and two could be inserted in the travel blade with each vial reading oppositely of each other. Washers could also be used at connection points.

The angle blade could be omitted entirely. But by doing this the integrity of the invention would be compromised since the angle blade has been designed to act as a stabilizer blade. In addition to serving as a stabilizer blade, the angle blade controls the base blade by keeping it from falling down thereby providing smoothness of operation along with previously stated duties.

The base blade pivot pin aperture could also be changed to a through slot running the length of base blade elongation.

Accordingly, the reader is requested to determine the scope of the invention by the appended claims and their legal equivalents, and not exclusively by the examples which have been given.

What is claimed is:

1. An adjustable pivot angle square comprising a base blade, a travel blade and an angle blade wherein:
   A. said base blades, said travel blade and said angle blade are separate, flat, elongated, rectangular members, pivotally interconnected by a rotating means;
   B. said travel blade has a top end and an lower end oppositely disposed from said top end;
   C. said angle blade has a lower end and an upper end oppositely disposed from said lower end;
   D. said base blade has a straight end and an angled end oppositely disposed from said straight end;
   E. a pivotal means connects said travel blade lower end to said base blade at said base blade angled end in a pivotal relationship;
   F. said travel blade has a travel slot extending through the center of said travel blade substantially the length of said travel blade elongation allowing full rotation of said travel blade;
   G. a movable means slidably connects said angle blade upper end to said travel slot;
   H. a rotatable means connects said angle blade lower end to said base blade at a point disposed closer to said base blade straight end than said base blade angled end;
   I. a movable means connects said travel blade upper end to said travel slot by a combination of a travel blade lock bolt mechanism and a travel slot pivot pin mechanism cooperating together;
   J. a slidable means rotatably connects said angle blade upper end and travel blade slot;
   K. a pivotal means allows said angle blade lower end to rotate on said base blade allowing said angle blade pivotal movement necessary for said travel blade to rotate smoothly clockwise or counter clockwise;
   L. said travel blade lock bolt mechanism and said travel slot pivot pin mechanism control said base blade movement and said travel blade movement;
   M. said travel blade lock bolt mechanism turns to release and to lock said travel blade, said angle blade and said base blade by pressure adjustment to the said travel slot pivot pin mechanism, whereby, the user by releasing said travel blade lock bolt mechanism, can pivot or rotate the adjustable pivot angle square to a full 360 (three hundred and sixty) degrees.

2. An adjustable pivot angle square according to claim 1 wherein:
   A. said travel blade and said base blade each contains a reversible level and plumb means.

3. An adjustable pivot angle square according to claim 1 wherein:
   A. said base blade unique design provides a unobstructed right hand inside shoulder; said base blade unique design provides a unobstructed left hand inside shoulder;
   B. said travel blade unique design provides a unobstructed first right hand marking and scoring edge; said travel blade unique design provides a unobstructed first left hand marking and scoring edge;
   C. said adjustable pivot angle square unique design ability provides a means to reverse from right hand operation to left hand operation and left hand operation to right hand operation by pivoted rotation; whereby user is always assured of unobstructed marking and scoring edges in any position whether in a right hand or left hand position.

4. An adjustable pivot angle square according to claim 1 wherein:
   A. said travel blade unique location design of a full length said travel blade slot and rotatable pivot positions provide said adjustable pivot angle square the capability to discern any straight line angle; said base blade and said travel blade reversible level and plumb mechanisms assure true and accurate templates; whereby user is fully assured of very precise discerning of angles and straight line configurations.

5. An adjustable pivot angle square according to claim 1 wherein;
   A. said travel blade design allows rotation to a 360 (three hundred and sixty) degree position;
   B. said base blade design allows rotation to a 360 (three hundred and sixty) degree position;
   C. said travel blade has an obstruction free edge that conforms to one side of an angle;
   D. said base blade has an obstruction free edge that conforms to one side of an angle;
   E. said travel design blade and said base blade design permits rotation together;
   F. said base blade design and said travel blade design enables separate operation of each other; whereby user can discern, transfer and layout a plurality of straight line configurations and angles regardless of existing angle degree.

* * * * *